US008437943B2

(12) United States Patent
Winsor et al.

(10) Patent No.: US 8,437,943 B2
(45) Date of Patent: May 7, 2013

(54) NOX CONTROL DURING LOAD INCREASES

(75) Inventors: Richard E. Winsor, Waterloo, IA (US);
Erik L. Piper, Cedar Falls, IA (US);
Kirby J. Baumgard, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 506 days.

(21) Appl. No.: 12/695,227

(22) Filed: Jan. 28, 2010

(65) Prior Publication Data
US 2011/0184631 A1 Jul. 28, 2011

(51) Int. Cl.
*F02M 51/00* (2006.01)

(52) U.S. Cl.
USPC ........... 701/103; 701/104; 701/108; 701/110; 123/492

(58) Field of Classification Search .................. 123/478, 123/492, 493, 568.21, 491, 688; 701/103, 701/104, 108, 109, 110, 105
See application file for complete search history.

(56) References Cited

U.S. PATENT DOCUMENTS

| | | | | | |
|---|---|---|---|---|---|
| 4,938,198 | A * | 7/1990 | Suzuki | | 123/676 |
| 5,009,210 | A * | 4/1991 | Nakagawa et al. | | 123/682 |
| 5,150,696 | A * | 9/1992 | Kabasin et al. | | 123/680 |
| 5,778,674 | A * | 7/1998 | Kimura | | 60/600 |
| 5,908,022 | A * | 6/1999 | Aoki et al. | | 123/568.16 |
| 5,921,223 | A * | 7/1999 | Fukuma | | 123/568.21 |
| 6,142,117 | A * | 11/2000 | Hori et al. | | 123/295 |
| 6,470,850 | B1 * | 10/2002 | Sasaki et al. | | 123/305 |
| 6,499,456 | B1 * | 12/2002 | Nogi et al. | | 123/295 |
| 6,508,241 | B2 * | 1/2003 | Miller et al. | | 123/672 |
| 6,644,286 | B2 * | 11/2003 | Kapolnek et al. | | 123/492 |
| 6,729,303 | B2 * | 5/2004 | Itoyama et al. | | 123/478 |
| 6,931,840 | B2 * | 8/2005 | Strayer et al. | | 60/285 |
| 7,044,103 | B2 * | 5/2006 | May | | 123/299 |
| 7,356,403 | B2 * | 4/2008 | Yoshioka et al. | | 701/108 |
| 7,707,821 | B1 * | 5/2010 | Legare | | 60/277 |
| 7,748,362 | B2 * | 7/2010 | Whitney et al. | | 123/406.23 |
| 7,886,523 | B1 * | 2/2011 | Legare | | 60/285 |
| 7,957,887 | B2 * | 6/2011 | Kumano et al. | | 701/103 |
| 8,056,546 | B2 * | 11/2011 | Boyer et al. | | 123/568.17 |
| 8,060,293 | B2 * | 11/2011 | Meyer et al. | | 701/104 |
| 8,108,128 | B2 * | 1/2012 | Zurlo et al. | | 701/108 |
| 2001/0052341 | A1 * | 12/2001 | Sasaki et al. | | 123/568.12 |
| 2001/0054416 | A1 * | 12/2001 | Yoshizaki et al. | | 123/568.12 |
| 2002/0038654 | A1 * | 4/2002 | Sasaki et al. | | 123/568.11 |
| 2002/0059914 | A1 * | 5/2002 | Yamaguchi et al. | | 123/299 |
| 2005/0171670 | A1 * | 8/2005 | Yoshioka et al. | | 701/54 |
| 2006/0032477 | A1 * | 2/2006 | May | | 123/299 |

(Continued)

FOREIGN PATENT DOCUMENTS

| | | |
|---|---|---|
| EP | 1544428 A1 | 6/2005 |
| EP | 1818522 A1 | 8/2007 |
| WO | 2009027737 A1 | 3/2009 |
| WO | 2009080152 A1 | 7/2009 |

*Primary Examiner* — Thomas Moulis

(57) ABSTRACT

A method of controlling a diesel engine connected to a load, the method including the steps of detecting an increased torque requirement and matching a fuel flow with an airflow. The detecting an increased torque requirement step detects an increased torque requirement for the engine, the increased torque requirement taking place during a period of time. The matching a fuel flow step matches a fuel flow with an airflow going to the engine during the increased torque requirement, the matching step keeps the airflow and the fuel flow during the period of time at a substantially stoichiometric level enabling the use of a three-way catalyst to reduce NOx emissions during transients.

20 Claims, 3 Drawing Sheets

U.S. PATENT DOCUMENTS

| | | |
|---|---|---|
| 2006/0196467 A1* | 9/2006 | Kang et al. ............... 123/305 |
| 2008/0110161 A1* | 5/2008 | Persson .................... 60/312 |
| 2008/0221780 A1* | 9/2008 | Ishikawa ................... 701/104 |
| 2008/0230041 A1* | 9/2008 | Brusslar et al. ........... 123/575 |
| 2009/0070002 A1* | 3/2009 | Ishikawa ................... 701/103 |
| 2009/0283070 A1* | 11/2009 | Whitney et al. ........ 123/339.11 |
| 2010/0131174 A1* | 5/2010 | Wiggins et al. ........... 701/103 |
| 2010/0242936 A1* | 9/2010 | Zurlo et al. ................ 123/704 |
| 2011/0126519 A1* | 6/2011 | Okada ....................... 60/276 |
| 2011/0132322 A1* | 6/2011 | Boyer et al. ............... 123/337 |

* cited by examiner

NOX CONTROL DURING LOAD INCREASES

BACKGROUND OF THE INVENTION

1. Field of the Invention

The present invention relates to a method and apparatus to control the fuel/air mixture of a diesel engine and, more particularly, to a method and apparatus to control the fuel and air ratio of a diesel engine during a load increase.

2. Description of the Related Art

In modern low-emission diesel engines, the fuel/air mixture is typically set lean of the stoichiometric level with exhaust gas recirculation (EGR) used to reduce NOx during steady state operation. During rapid load increases on turbocharged diesel engines, the air flow increase lags behind the fuel flow increase and results in relatively rich operating conditions. This results in increased smoke and particulate emissions. Typically, the EGR flow is reduced or eliminated during rapid load increases to reduce smoke and particulates. However, this causes high NOx emissions from the engine.

In internal combustion engines, EGR is a NOx emission reduction technique used in most gasoline and diesel engines. EGR works by recycling a portion of an engine's exhaust gas back to the engine cylinders. Often, the EGR gas is cooled through a heat exchanger to allow introduction of a greater mass of the recirculated gas into a diesel engine. Since diesel engines are typically unthrottled, EGR does not lower throttling losses in the way that it does for gasoline engines. However, the exhaust gas, which is largely carbon dioxide and water vapor, has a much lower oxygen mass fraction than air, and so it serves to lower peak combustion temperatures. There are tradeoffs, however, adding EGR to a diesel reduces the specific heat ratio of the combustion gases in the power stroke. This reduces the amount of power that can be extracted by the piston. EGR also tends to reduce the amount of fuel burned in the power stroke. This is evident by the increase in particulate emissions that correspond to an increase in EGR. Particulate matter, which may mainly be composed of carbon, but is not burned in the power stroke is wasted energy.

Usually, an engine recirculates exhaust gas by piping it from the exhaust manifold to the inlet manifold. A control valve (EGR valve) within the EGR circuit regulates the time and the amount of return flow.

The air/fuel ratio is the mass ratio of air to fuel present during combustion. When all of the fuel is combined with all of the free oxygen, typically within a vehicle's combustion chamber, the mixture is chemically balanced and this air/fuel ratio is called a stoichiometric mixture. In theory, a stoichiometric mixture has just enough air to completely burn the available fuel. In practice, this is never quite achieved, due primarily to the very short time available for the combustion in an internal combustion engine for each combustion cycle.

What is needed in the art is a method and an apparatus to reduce pollutants during an increased torque requirement transition for diesel engines.

SUMMARY OF THE INVENTION

The present invention relates to a method and apparatus for controlling fuel/air mixture ratio during a load increase transition in a diesel engine.

The invention in one form is directed to a method of controlling a diesel engine connected to a load including the step of detecting the need for a higher torque output by the engine and matching a fuel flow with the airflow going to the engine during the load increase. The matching of the fuel flow with the air flow keeps the fuel flow and airflow during the load increase at a substantially stoichiometric level.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiment of the invention and such exemplification is not to be construed as limiting the scope of the invention in any manner.

DETAILED DESCRIPTION OF THE INVENTION

Figure 1:
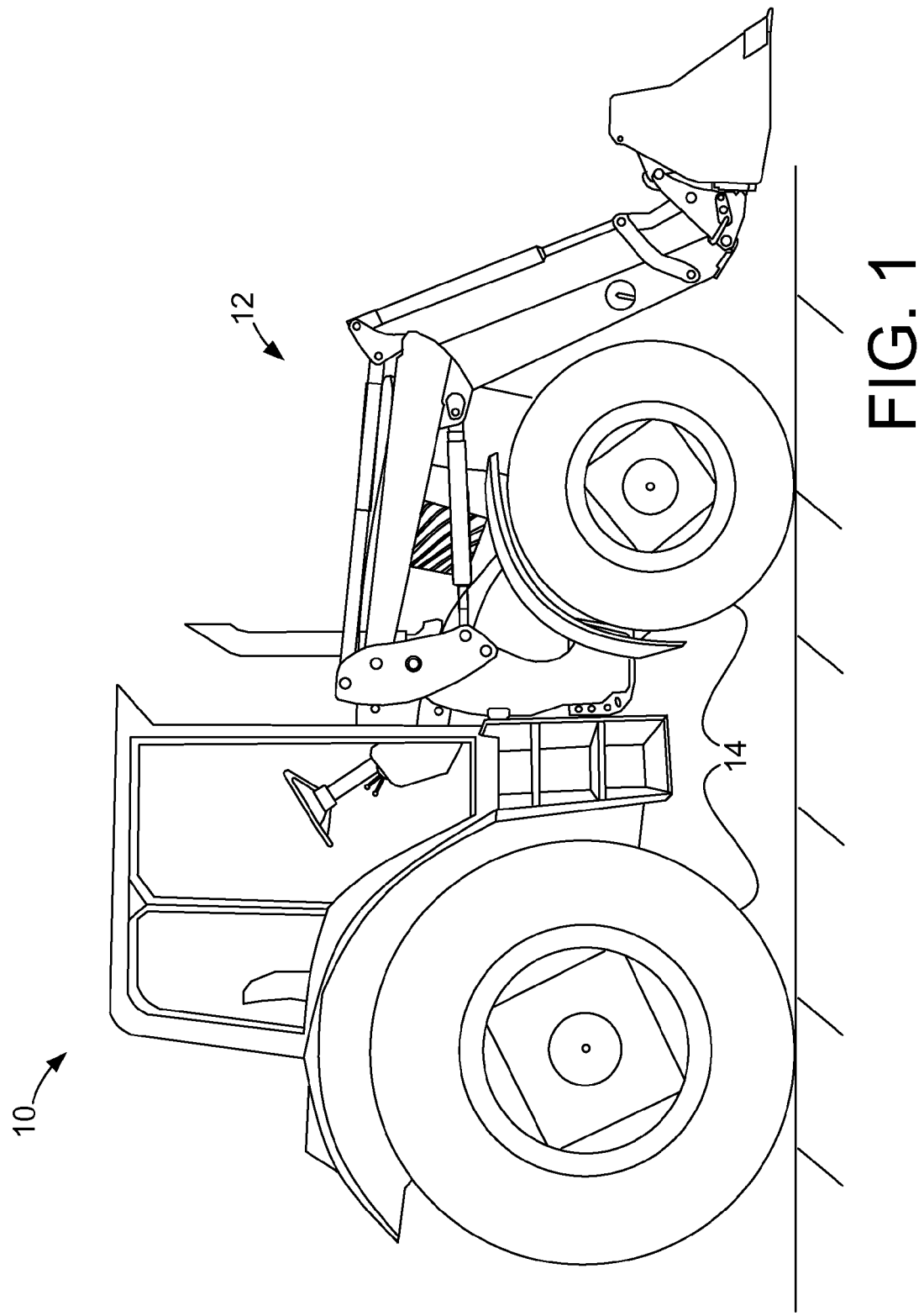
FIG. 1 is a vehicle having a diesel engine utilizing an embodiment of the fuel control system of the present invention.

Referring now to the drawings, and more particularly to FIG. 1, there is illustrated a vehicle 10 in the form of an agricultural vehicle 10 also known as a tractor 10 having a loader attached thereto. Vehicle 10 includes a power generating system 12 that provides power to various aspects of vehicle 10 including motive power for wheels 14. Although vehicle 10 is illustrated as a tractor 10, it is to be understood that the present invention relates to any vehicle 10 and, more generally, to any power generating system 12 whether utilized by vehicle 10 or not.

Figure 2:
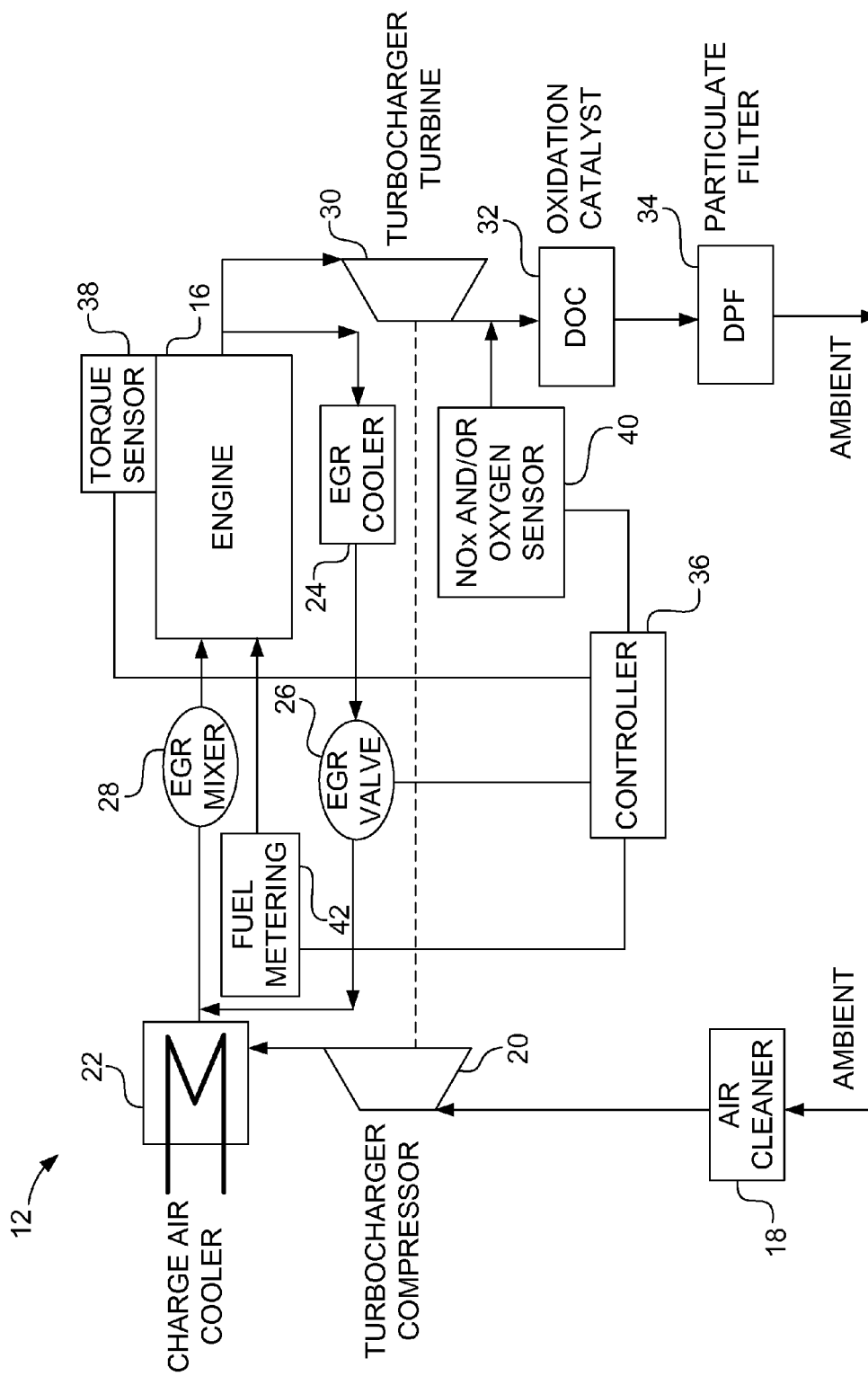
FIG. 2 is a block diagram illustrating an apparatus that utilizes the method used in FIG. 1.

Now, additionally referring to FIG. 2, there is illustrated details of power generating system 12 including engine 16 having an air cleaner 18, a turbocharger compressor 20, an air cooler 22, an EGR cooler 24, an EGR valve 26, an EGR mixer 28, a turbocharger turbine 30, a diesel oxidization catalyst 32, a diesel particulate filter 34, a controller 36, a torque or speed sensor 38, a gas sensor 40, and a fuel metering system 42. Ambient air flows through air cleaner 18, is compressed in turbocharger compressor 20, is then cooled by cooler 22, has exhaust gas mixed with the airflow in EGR mixer 28, the mixture then flows to combustion chambers in engine 16. Assuming, for the sake of clarity, that engine 16 is a diesel engine, fuel is then injected into each of the cylinders when the compression and cycle of the engine is appropriate for the injection thereof. Fuel is injected by way of fuel metering system 42 causing combustion to take place in the cylinders and the exhaust flows out from engine 16 passing either to an EGR cooler 24 or past turbocharger turbine 30. The exhaust gas flow past turbocharger turbine 30 causes it to rotate and drives turbocharger compressor 20. The exhaust gas flows by gas sensor 40 and then continues through diesel oxidization catalyst 32 and particulate filter 34 and the remaining gas is exhausted to the ambient atmosphere.

The exhaust gas that flows by gas sensor 40 has a particular NOx and/or oxygen content, which is sensed by gas sensor 40. The exhaust gas that is diverted through the exhaust gas recirculation system first goes through a cooling process by EGR cooler 24 and EGR valve 26 is under the control of controller 36 which can moderate the flow or completely shut-off the flow of the EGR. Exhaust gas that is recirculated may enter directly into EGR mixer 28 rather than into the flow as shown in FIG. 2. Controller 36 is communicatively connected to speed sensor 38, gas sensor 40, fuel metering device 42, and EGR valve 26.

Figure 3:
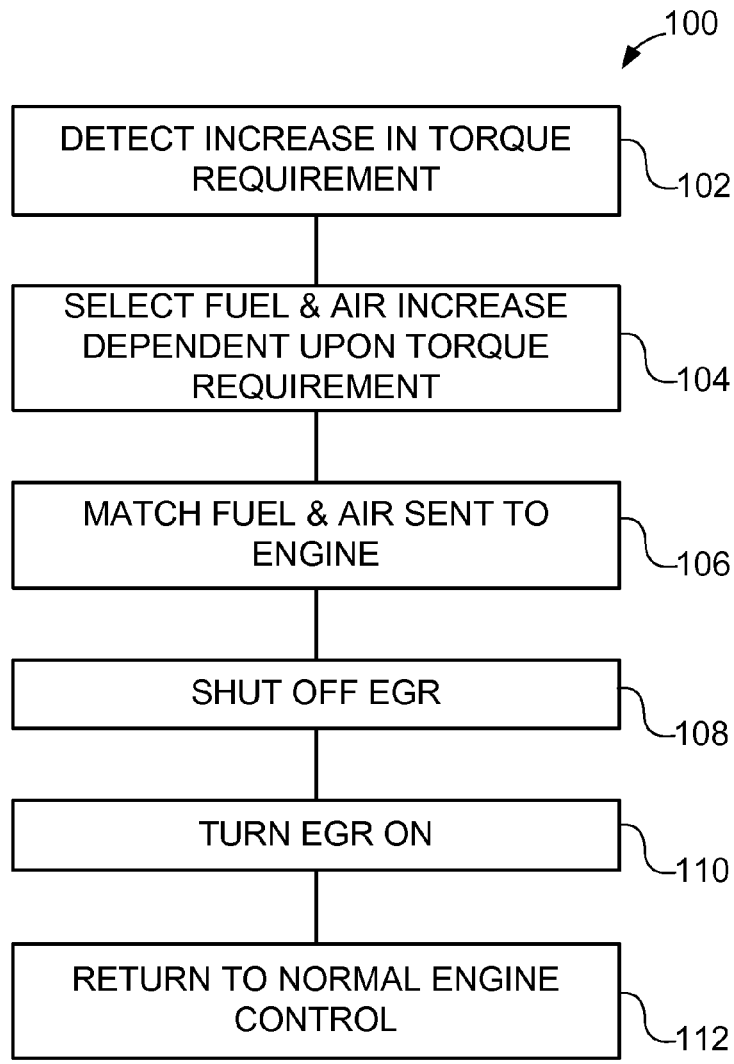
FIG. 3 illustrates the steps of an embodiment of the method utilized in the apparatus of FIG. 2.
Figure 4:
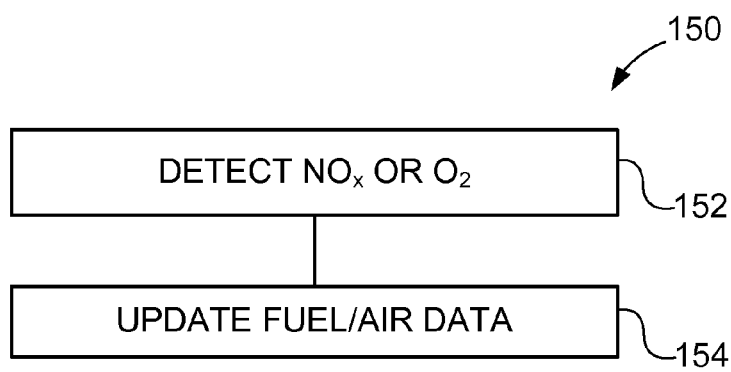
FIG. 4 illustrates an embodiment of another method utilized in conjunction with the method of FIG. 3 of the present invention.

Now, additionally referring to FIGS. 3 and 4, there is illustrated methods 100 and 150 that carry out the control steps of the present invention. The steps may be carried out by way of hardware, an algorithm stored in controller 36, or a combination of hardware and software. At step 102, there is a detection of an increase in torque requirement for engine 16 that is sensed by speed sensor 38 and conveyed to controller 36. Although schematically shown as a speed sensor connected to engine 16, the sensing of torque requirement can be a combination of an anticipated load sensing system as well as increased load detection. Once the increase in needed torque is detected, the amount of the torque that is anticipated is utilized in step 104 to select the amount of fuel to match with the available airflow to engine 16. The selection of the amount of fuel can be a selection based upon an entry in a look-up table having an amount that matches the detected torque requirement to a selected fuel amount or the amount of fuel may be determined as a result of an algorithm that may include fixed and changeable coefficients.

At step 106, the fuel and air is matched and sent to engine 16 based upon the selection that occurred in step 104. The selection at step 104 and the matching of the fuel to the air at step 106 is part of the adaptive control system of the present invention and is carried out to cause the fuel and air mixture to be substantially stoichiometric during the load increase.

While the fuel is being sent to engine 16, the EGR may be shut off at step 108 or be moderated at step 108 for a certain period of time and then subsequently turned on at step 110 which may correspond to the meeting of the torque increase and engine 16 is then operating at a new static load level. At step 112, the engine control is returned to its normal operating mode. The normal operating mode may include active controls that adjust the EGR flow as well as the fuel metering based upon information from gas sensor 40. However, it should be noted that during the carrying out of the steps of the present invention that the current input from the gas sensor 40 is not utilized to select the fuel and air flow to engine 16, rather, fuel is selected based upon the detected torque requirement and the amount of fuel is determined from a data look-up table or an algorithm based on the available air as previously discussed. Controller 36 evaluates the performance of engine 16 during the torque increase response with data from, among other things, gas sensor 40 and, in the event the information indicates a need to adjust the look up table and/or algorithm utilized by step 104, controller 36 updates the values and/or variables so that the next time an increase in torque in the amount encountered occurs a more appropriate fuel selection can be utilized by controller 36. This adaptive control system is needed since the open loop response inherent in such a system is evaluated and updated for an improved response the next time a torque requirement in a similar amount is encountered.

This updating process is illustrated in method 150 where the detection of NOx or O$_2$ carried out at step 152 by utilizing gas sensor 40 and the data is updated at step 154. Method 150 may run in parallel to method 100 as part of the adaptive control system.

In the present invention, it can be considered that engine 16 is calibrated so that rapid load increases occur with a substantially stoichiometric fuel/air ratio, preferably with little or no EGR. Because the load increases will occur at or near stoichiometric conditions, the three-way catalyst which may be diesel oxidization catalyst 32, which consists of one or more precious metal such as palladium, platinum, rhodium, etc., can be used to remove NOx emissions from the exhaust gas. Catalyst 32 and filter 32 could be modified to enhance the NOx removing function by changing the catalyst wash coat or precious metal.

As methods 100 and 150 are carried out, engine 16 operates at or substantially at stoichiometric conditions, with or without EGR, during rapid load increases. Catalyst 32 serves to react with and remove NOx emissions from the exhaust gas. The operating range of the catalyst is approximately 200° C. to above 1000° C. so it will effectively remove NOx throughout the operating range of engine 16.

Gas sensor 40 may be a switching oxygen sensor that is used to confirm that the fuel/air mixture was substantially stoichiometric during the rapid load increase as described regarding method 150, and the calibration elements contained in a data table are adjusted if the mixture has strayed from stoichiometric conditions due to changes in power generating system 12, such as fuel injector wear, air flow measurement drift, or other changes to the engine.

Advantageously, the present invention controls the engine operating conditions during torque load increases so that a near stoichiometric combustion occurs during these rapid load increases, thereby reducing NOx due to the high efficiency of the catalyst and high torque is output because fueling is appropriate to the air flowing into engine 16. If the torque demand and trapped air is such that the fueling would not be sufficient to reach stoichiometric, EGR would be added to reduce the trapped air to reach near stoichiometric exhaust conditions. Advantageously, this concept provides a more responsive engine with lower NOx than conventional fueling controls. It does not require additional hardware on an engine that already has a catalyst for hydrocarbon control or a diesel particulate regeneration or a diesel particulate filter for diesel particulate removal. Advantageously, the switching oxygen sensor 40 is used to adjust the calibration to compensate for engine wear and other changes to power generating system 12. The present invention can be used with or without EGR, although low emission diesel engines typically have EGR.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of controlling a diesel engine connected to a load, the method comprising the steps of:
   detecting an increased torque requirement for the engine, said increased torque requirement taking place during a period of time;
   matching a fuel flow with an airflow going to the engine during said increased torque requirement, said matching step keeps said airflow and said fuel flow during said period of time at a substantially stoichiometric level; and
   ignoring inputs from at least one of a NOx sensor and an oxygen sensor during the carrying out of said matching step.

2. The method of claim 1, further comprising the step of reducing an exhaust gas recirculation flow to the engine during at least a portion of said period of time.

3. The method of claim 2, wherein said reducing step shuts off said exhaust gas recirculation flow during part of said period of time.

4. The method of claim 3, further comprising the step of turning on said exhaust gas recirculation flow after said portion of said period of time.

5. The method of claim 1, wherein said matching step includes comparing said increased torque requirement to a set of predetermined values to thereby determine said fuel flow.

6. The method of claim 1, wherein said fuel flow is a predetermined amount corresponding to said increased torque requirement.

7. The method of claim 6, wherein said predetermined amount is selected from a set of values each corresponding to a specific torque increase.

8. The method of claim 7, further comprising the step of detecting a gas level of at least one of a NOx content and an Oxygen content in an exhaust gas flow from the engine apart from said matching step.

9. The method of claim 8, further comprising the step of updating at least one value in said set of values corresponding to said gas level detected in said detecting a gas level step.

10. The method of claim 9, further comprising the step of not using the method when there is no longer an increased torque requirement.

11. A method of controlling fuel flow in a diesel engine connected to a load, the method comprising the steps of:
   detecting a changing load on the engine, said changing load taking place during a period of time;
   matching a fuel flow with an airflow going to the engine during said period of time, said matching step selecting said fuel flow during said period of time so that combustion in the engine is at a substantially stoichiometric level; and
   ignoring inputs from at least one of a NOx sensor and an oxygen sensor during said period of time.

12. The method of claim 11, further comprising the step of shutting off an exhaust gas recirculation flow to the engine during at least a portion of said period of time.

13. The method of claim 12, wherein said shutting off step shuts off said exhaust gas recirculation flow during all of said period of time.

14. The method of claim 12, further comprising the step of turning on said exhaust gas recirculation flow after said portion of said period of time.

15. The method of claim 11, wherein said matching step includes comparing said increased load to a set of predetermined values to thereby determine said fuel flow during said period of time.

16. The method of claim 11, wherein said fuel flow is a predetermined amount corresponding to said increased load.

17. The method of claim 16, wherein said predetermined amount is selected from a set of values each corresponding to a specific load increase.

18. The method of claim 17, further comprising the step of detecting a gas level of at least one of a NOx content and an Oxygen content in an exhaust gas flow from the engine apart from said period of time.

19. The method of claim 18, further comprising the step of updating at least one value in said set of values corresponding to said gas level detected in said detecting a gas level step.

20. The method of claim 19, further comprising the step of not using the method outside of said period of time.

* * * * *